United States Patent
Labitt

(10) Patent No.: US 6,297,762 B1
(45) Date of Patent: Oct. 2, 2001

(54) ELECTRONIC COUNTERMEASURES SYSTEM

(75) Inventor: Bernard H. Labitt, Needham, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 06/058,891

(22) Filed: Jun. 27, 1979

(51) Int. Cl.$^7$ ........................................ G01S 7/38

(52) U.S. Cl. ................................ 342/14; 342/13; 455/1

(58) Field of Search ..................... 343/18 E; 342/13, 342/14, 15, 16, 17, 18, 19, 20, 175, 147, 156, 195, 417–424; 455/1

(56) References Cited

U.S. PATENT DOCUMENTS

| 3,072,848 | * | 1/1963 | De Socio | 455/1 |
| 4,117,484 | * | 9/1978 | Shizume | 342/15 |

OTHER PUBLICATIONS

J.H, Dunn et al., "Phenomena of Scintiliation Noise in Radar Tracking Systems," Proceedings of the IRE, (May 1959 issue), pp. 855–863, May 1955.*

* cited by examiner

Primary Examiner—Bernarr E. Gregory
(74) Attorney, Agent, or Firm—Daly, Crowley & Mofford,LLP

(57) ABSTRACT

Apparatus for detecting the difference in phase between received signals at two spaced antennas and for then retransmitting equal amplitude antiphase signals from the two spaced antennas is disclosed.

3 Claims, 1 Drawing Sheet

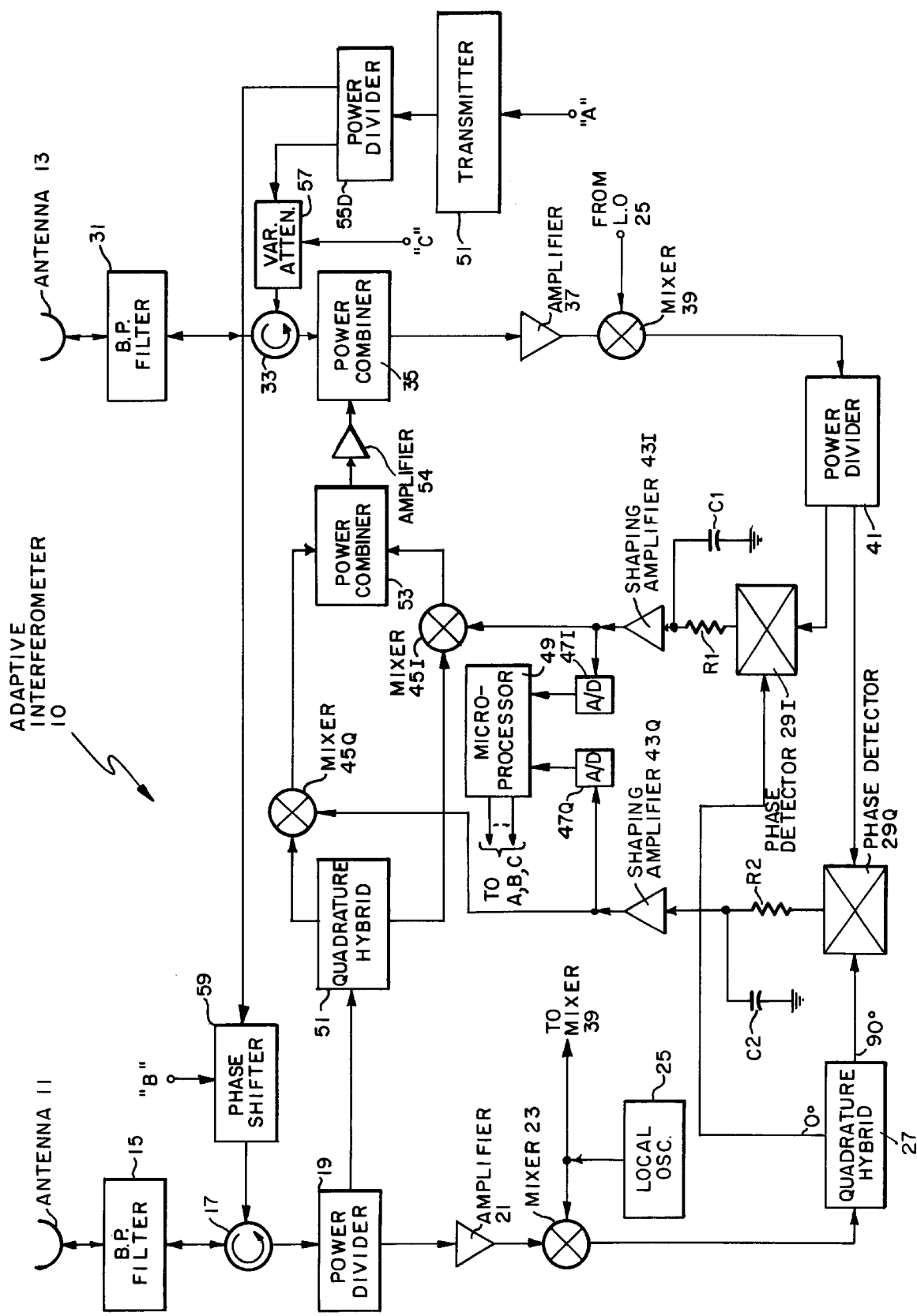

ELECTRONIC COUNTERMEASURES SYSTEM

BACKGROUND OF THE INVENTION

This invention pertains generally to electronic countermeasure (ECM) systems and more particularly to an adaptive interferometer for causing errors to be introduced into a tracking radar.

The cost of modern fighter aircraft coupled with the increased effectiveness of ground-to-air missile defense systems has resulted in the development of ECM systems designed to mask such aircraft from ground-based fire control radars. One known type of ECM system designed to protect a penetrating aircraft against a surface-to-air missile which is being guided by a command guidance system is the so-called "Cross-Eye" system. With such a system a portion of the signal transmitted by a control radar, say a ground-based fire control radar, is received at the penetrating aircraft and then is processed to be retransmitted as a pair of equal amplitude, but 180° phase-opposed, signals (referred to hereinafter as the "jamming signals") in the direction of the ground based fire control radar. The magnitude of the jamming signals is sufficient to mask the skin return from a penetrating aircraft so that the ground-based fire control radar is caused to attempt to track on the jamming signals with the final result that unacceptably large tracking errors are engendered and a guided missile in flight toward the penetrating aircraft is misguided.

Generally, an aircraft employing a "Cross-Eye" system has an appropriate transmitting and receiving antenna located on each of its wings. Thus, a receiving antenna located on a first one of the wings is connected, via an amplifier and requisite transmission lines, to a transmitting antenna disposed on the second wing. In like manner, a receiving antenna located on the second wing is connected, via a 180° phase shifter, an amplifier, and requisite transmission lines, to a transmitting antenna located on the first wing.

It will be appreciated by those of skill in the art that the effectiveness of such "Cross-Eye" systems is dependent upon how well the amplitude and phase of the retransmitted signals are controlled. Unfortunately, however, with transmitting and receiving antennas located on opposite wing tips, it is virtually impossible, even in the best of conditions, to provide the required accuracy in phase and amplitude of the retransmitted, or jamming signals. The problem is even more difficult in the severe vibration environment and over temperature extremes often experienced by any aircraft.

SUMMARY OF THE INVENTION

With this background of the invention in mind, it is an object of this invention to provide an adaptive interferometer which will automatically compensate for differential phase shifts between a pair of receiving and transmitting antennas.

The foregoing and other objects of the invention are attained generally by providing an adaptive interferometer comprising a pair of antennas which may operate as either receiving or transmitting antennas and signal processing means to maintain a desired relationship in phase and amplitude between jamming signals. In the receive mode of operation received signals from a first one of the antennas is split with a first portion thereof being applied, via a quadrature hybrid, to a pair of mixers and a second portion being down-converted to suitable video signals and subsequently applied, via a quadrature hybrid, to a pair of quadrature phase detectors to which reference signals derived from signals received by the second antenna are also applied. After suitable processing, the output signals from the quadrature phase detectors are applied as reference signals to the pair of mixers. The vector sum of the output signals from the mixers, which are proportional-to the product of the input signals, is formed and combined with the signal received by the second antenna, ultimately to cancel that signal. When cancellation of the received signals is achieved, a transmitter is activated. The output signal from the transmitter is passed via a variable attenuator to the second antenna and via a phase shifter, controlled by the microprocessor, to the first antenna, such that the signal radiated by the first antenna is the complex conjugate of the signal that,when combined with the signal received by the second antenna, cancelled that received signal. The variable attenuator, which is also controlled by the microprocessor, is provided in the path between the transmitter and the second antenna to compensate for the insertion loss of the phase shifter to ensure that equal amplitude signals are fed to both antennas.

BRIEF DESCRIPTION OF THE DRAWING

The foregoing features of this invention, as well as the invention itself, may be more fully understood from the following detailed description read together with the accompanying drawing in which the single FIGURE is a simplified block diagram of an adaptive interferometer according to the invention.

DESCRIPTION OF THE PREFERRED EMBODIMENT

Referring now to the single FIGURE, an adaptive interferometer according to the herein contemplated invention is shown to include a pair of antennas 11, 13 which are here assumed to have identical gain characteristics and which are used for both receiving signals from a fire control radar (not shown) and for transmitting jamming signals back to that radar. The signals received by antenna 11 are passed, via a bandpass filter 15 and a high power circulator 17, to a power divider 19. The latter is operative to split the received signal into two portions, with a first portion being applied (via an amplifier 21) to a mixer 2.3 to be heterodyned with a signal from a local oscillator 25 to produce a corresponding video signal. Such video signal is passed to a quadrature hybrid 27 operative to split the video signal into two parts, a so-called in-phase (I) and quadrature phase (Q) output signal which are applied, respectively, to phase detectors 29I, 29Q. The reference signals for the latter are the signals received by the antenna 13 which have been passed, via a bandpass filter 31, a circulator 33, a 180° hybrid combiner 35, and an amplifier 37, to a mixer 39. The reference signal to the mixer 39 is the same as that applied to the mixer 23 so that video signals are produced which serve, after being split by a power divider 41, as reference signals to the phase detectors 29I, 29Q.

It will now be appreciated by those of skill in the art that, because the input signals to the phase detectors 29I, 29Q are at the same frequency, the output signal from each of such detectors is a DC voltage whose magnitude is proportional to the phase difference between the signals received by antennas 11, 13. The output signals from the phase detectors 29I, 29Q are filtered by low pass filters (not numbered) comprising, respectively, resistor R1 and capacitor C1 and resistor R2 and capacitor C2. The output signals from the low pass filters (not numbered) are passed, via shaping amplifiers 43I, 43Q, as reference signals to a pair of mixers 45I, 45Q. It is noted here in passing that a portion of the output signals from each one of the shaping amplifiers 43I, 43Q is also passed, via analog-to-digital (A/D) converters 47I, 47Q, to a microprocessor 49 for reasons which will be explained in detail hereinafter.

The mixers 45I, 45Q are shown to receive quadrature-phased input signals from a quadrature hybrid 51 corresponding to a portion of the signals received by the antenna 11. The vector sum of the output signals from the mixers 45I, 45Q is formed in a power combiner 53 and passed via an amplifier 54 to the 180° hybrid combiner 35 for combination with the signals received by the antenna 13.

Digressing here now for a moment, it will be shown that if the mixers 45I, 45Q are operated as square law devices, a component of the output signals from such mixers will be proportional to the product of the input signals. The well known power series representation of a mixer is useful in predicting the various output products,. Thus, the current, i, flowing in a nonlinear resistance may be represented by a power series of the voltage, V, across the resistor terminals as follows:

$$i = a_0 + a_1 V + a_2 V^2 + a_3 V^3 + \ldots + a_n V^n, \quad \text{Eq. (1)}$$

where $a_0 \ldots a_n$ are constants.

The voltage $V_{IN}$, applied to the mixers 45I, 45Q, is equal to the sum of a local oscillator voltage and the signal voltage and may be expressed as:

$$V_{IN} = R(t) + \sin \omega t \quad \text{Eq. (2)}$$

where $R(t)$ is the local oscillator voltage applied to the mixers 45I, 45Q and f is the radio frequency (RF) of the applied signal. If the mixers 45I, 45Q are operated in their square law regions, then all but the third term of Eq. (1) may be neglected with the result that Eq. (2) applies, meaning that if (2) is inserted in the retained portion of Eq. (1) and the indicated expansion is carried out, there will be a component proportional to the product of the input signals to the mixers 45I, 45Q. It is here immaterial that the "local oscillator" signal into the mixers 45I, 45Q is a D.C. signal.

It should now be appreciated by those of skill in the art. that the just described elements are effective to form a closed loop which will force the signals being combined in the 180° hybrid combiner 35 to cancel each other. It will also be appreciated that when cancellation is obtained, the phase of the signals received by the antenna 11, as seen at the input of the 180° hybrid combiner 35, will have been rotated to be coincident in phase with the signals received by the antenna 13, also as seen at the input of the 180° hybrid combiner 35. The output signals of the phase detectors 29I, 29Q are D.C. signals, which, taken together, represent the phase difference between the signals received by the antennas 11, 13.

As previously mentioned, the output signals from the phase detectors 29I, 29Q are passed, via the low pass filters (not numbered), the shaping amplifiers 43I, 43Q, and the A/D converters 47I, 47Q, to the microprocessor 49. The latter, which is here a Model 9900 manufactured by Texas Instruments, Dallas, Tex., is effective to, inter alia, provide a control signal to a transmitter 51, which is here of conventional design and may, for example, comprise a high power traveling wave tube (TWT) amplifier. That control signal is effective to gate "ON" the transmitter 51 when the microprocessor 49 senses that the phase-lock loop (not numbered) has reached a lock condition as determined by the signals from the phase detectors 29I, 29Q. It is felt that the requisite control program to enable the microprocessor 49 to monitor the input signals from the phase detectors 29I, 29Q ultimately to produce the transmitter control signal is a matter involving ordinary skill in the art and it will therefore not be recounted here.

The output signal from the transmitter 51 is split in a power divider 55D, with a first portion being passed, via a variable attenuator 57, which is here of conventional design, the circulator 33 and the bandpass filter 31 to the antenna 1.S. The second output signal from the power divider SSD is passed, via a high power phase shifter 59, the circulator 17 and the bandpass filter 15 to the antenna 11. The high power phase shifter 59 may, for example, be a digitally controlled phase shifter Series 84-32-114 manufactured by Microwave Associates, Burlington, Mass. Both the variable attenuator 57 and the high power phase shifter 59 are shown to receive control signals from the microprocessor 49 to balance the phase and amplitude of the signals transmitted from the antennas 11, 13.

It may be shown that the jamming signals retransmitted to the fire control radar (not shown) are most effective when the antenna 11 transmits a signal which is 180° out-of-phase with the signal from the power combiner 53 when cancellation within the 180° hybrid power combiner 35 is achieved. It should be noted here in passing that the signals from the antenna 11, as seen at the input of the 180° hybrid power combiner, experience an additional phase delay vis-a-vis the signals from antenna 13 to the same point by virtue of the fact that the signals from the former traverse the power divider 19, the quadrature hybrid 51, the mixers 45I, 45Q and the power combiner 53 before reaching the 180° hybrid power combiner 35. It will be appreciated by those of skill in the art that the phase delays through the just-recited devices may be stored within the microprocessor 49 and used by the latter in conjunction with the input signals from the phase detectors 29I, 29Q to provide the requisite control signals for the high power phase shifter 59. It should also be noted that the variable attenuator 57 is provided in the path between the power divider 55D and the circulator 33 to compensate for the insertion loss of the high power phase shifter 59 in the path between the power divider 55D and the circulator 17 to ensure that equal amplitude signals will be provided to both the antennas 11 and 13.

Having described a preferred embodiment of this invention, it will be clear to one of skill in the art that changes may be made without departing from my inventive concepts. For example, if the antenna 11 were higher in gain than antenna 13 the variable attenuator 57 would be provided in series with the high power phase shifter 59. It is felt, therefore, that this invention should not be restricted to its disclosed embodiment, but rather should be limited only by the spirit and scope of the appended claims.

What is claimed is:

1. Apparatus for use in an aircraft to process signals from a radar and then to transmit a pair of equal amplitude, antiphase jamming signals toward such radar, such apparatus comprising:

(a) a pair of antenna assemblies, disposed at different locations on the aircraft, for receiving signals from the radar and for transmitting jamming signals;

(b) first means, initially responsive to received signals from the pair of antenna assemblies, for measuring the phase of one of such received signals relative to the other to provide a first set of control signals indicative of the difference in phase between the received signals;

(c) second means, responsive to the first set of control signals and to a portion of one of the received signals, for shifting the phase of such portion into phase coincidence with the other one of the received signals and to change the first set of control signals to indicate such coincidence; and (d) third means, responsive to the first set of control signals when such signals indicate phase coincidence between the portion of one of the received signals and the other one of such signals, for applying equal amplitude antiphase jamming signals to the pair of antenna assemblies.

2. Apparatus as in claim 1 wherein the first means comprises a pair of quadrature phase detectors to which intermediate frequency signals derived from the received signals are applied, the amplitude and sense of the outputs of such phase detectors constituting the first set of control signals.

3. Apparatus as in claim 2 wherein the second means comprises:

(a) means for dividing the portion of one of the received signals into a pair of radio frequency signals in quadrature;

(b) means, including a square law detector biased by an appropriate one of the first set of control signals, for producing radio frequency signals whose vector sum is a radio frequency signal having a phase, relative to the second one of the received signals, which may be shifted;

(c) means for combining the radio frequency signals out of the square law detectors to form the radio frequency signal; and (d) means for combining the radio frequency signal and the second received signal to provide a null signal indicative of phase coincidence between the radio frequency signal and the second received signal.

\* \* \* \* \*